(12) United States Patent
Duckett

(10) Patent No.: US 9,367,765 B2
(45) Date of Patent: Jun. 14, 2016

(54) METHOD AND APPARATUS FOR AUTOMATIC DETECTION OF FEATURES IN AN IMAGE AND METHOD FOR TRAINING THE APPARATUS

(71) Applicant: UNIVERSITY OF LINCOLN, Lincoln (GB)

(72) Inventor: Thomas Dollings Duckett, Lincoln (GB)

(73) Assignee: UNIVERSITY OF LINCOLN, Lincoln (GB)

(*) Notice: Subject to any disclaimer, the term of this patent is extended or adjusted under 35 U.S.C. 154(b) by 65 days.

(21) Appl. No.: 14/362,717

(22) PCT Filed: Dec. 5, 2012

(86) PCT No.: PCT/GB2012/053019
§ 371 (c)(1),
(2) Date: Jun. 4, 2014

(87) PCT Pub. No.: WO2013/083972
PCT Pub. Date: Jun. 13, 2013

(65) Prior Publication Data
US 2014/0294239 A1    Oct. 2, 2014

(30) Foreign Application Priority Data

Dec. 5, 2011    (GB) .................................. 1120865.9

(51) Int. Cl.
G06K 9/62        (2006.01)
G06T 7/00        (2006.01)

(52) U.S. Cl.
CPC .............. *G06K 9/6228* (2013.01); *G06K 9/628* (2013.01); *G06K 9/6231* (2013.01);
(Continued)

(58) Field of Classification Search
USPC .......................................................... 382/103
See application file for complete search history.

(56) References Cited

U.S. PATENT DOCUMENTS 6,246,782 B1    6/2001    Shapiro et al.
2006/0062477 A1    3/2006    Haga et al.
(Continued)

FOREIGN PATENT DOCUMENTS

WO    2005008572    1/2005
WO    2006054269    5/2006
WO    2006054272    5/2006

OTHER PUBLICATIONS

Boosting Minimalist Classifiers for Blemish Detection in Potatoes. Barnes et al. 2009.*
(Continued)

*Primary Examiner* — Stephen R Koziol
*Assistant Examiner* — Delomia L Gilliard
(74) *Attorney, Agent, or Firm* — Michael Best & Friedrich LLP

(57) ABSTRACT

In one or more embodiments described herein, there is provided a method of training an apparatus. The method trains the apparatus to automatically detect features of interest in an image. An image is received, the image being of at least one object for inspection, each image comprising a plurality of pixels. The image is segmented into a plurality of superpixels, each superpixel comprising a plurality of pixels which each have similar image data attributes to one another. The superpixels are classified into at least two classes in response to user input identifying at least one feature of interest in one or more of the super-pixels. From a library of image data attributes, a subset of image data attributes is determined that provides preferential discrimination between the at least two classes. The apparatus is then trained using said determined subset of image data attributes to thereby enable the apparatus to classify super-pixels of an image into the at least two classes.

19 Claims, 2 Drawing Sheets

(52) U.S. Cl.
CPC ........... *G06K 9/6234* (2013.01); *G06K 9/6256* (2013.01); *G06K 9/6263* (2013.01); *G06K 9/6267* (2013.01); *G06T 7/0008* (2013.01)

(56) References Cited

U.S. PATENT DOCUMENTS

| | | | |
|---|---|---|---|
| 2007/0047786 A1 | 3/2007 | Aklilu et al. | |
| 2008/0310737 A1 | 12/2008 | Han et al. | |
| 2013/0188869 A1* | 7/2013 | Yoo | G06T 7/0093 382/173 |

OTHER PUBLICATIONS

Class Segmentation and Object Localization with Superpixel Neighborhoods. Fulkerson et al. 2009.*

Barnes, M. et al., "Boosting Minimalist Classifiers for Blemish Detection in Potatoes," 24th International Conference Image and Vision Computing, New Zealand, 2009, pp. 397-402.

Barnes, M. et al., "Visual detection of blemishes in potatoes using minimalist boosted classifiers," Journal of Food Engineering 98, 2010, pp. 339-346.

Fulkerson, B. et al., "Class Segmentation and Object Localization with Superpixel Neighborhoods," 12th International Conference on Computer Vision, 2009, pp. 670-677.

Levinshtein, A. et al., "TuboPixels: Fast Superpixels Using Geometric Flows," IEEE Transactions on Pattern Analysis and Machine Intelligence, vol. 31, No. 12, Dec. 2009, pp. 2290-2297.

Wikipedia, the free encyclopedia, "Viola-Jones object detection framework," downloaded from: <http://en.wikipedia.org/w/index.php?title=Viola%E2%80%> on or around Nov. 17, 2011, last modified on Sep. 9, 2011, 3 pages.

United Kingdom Search Report for Application No. GB1120865.9 dated Apr. 2, 2012 (1 page).

International Search Report for Application No. PCT/GB2012/053019 dated May 3, 2013 (2 pages).

* cited by examiner

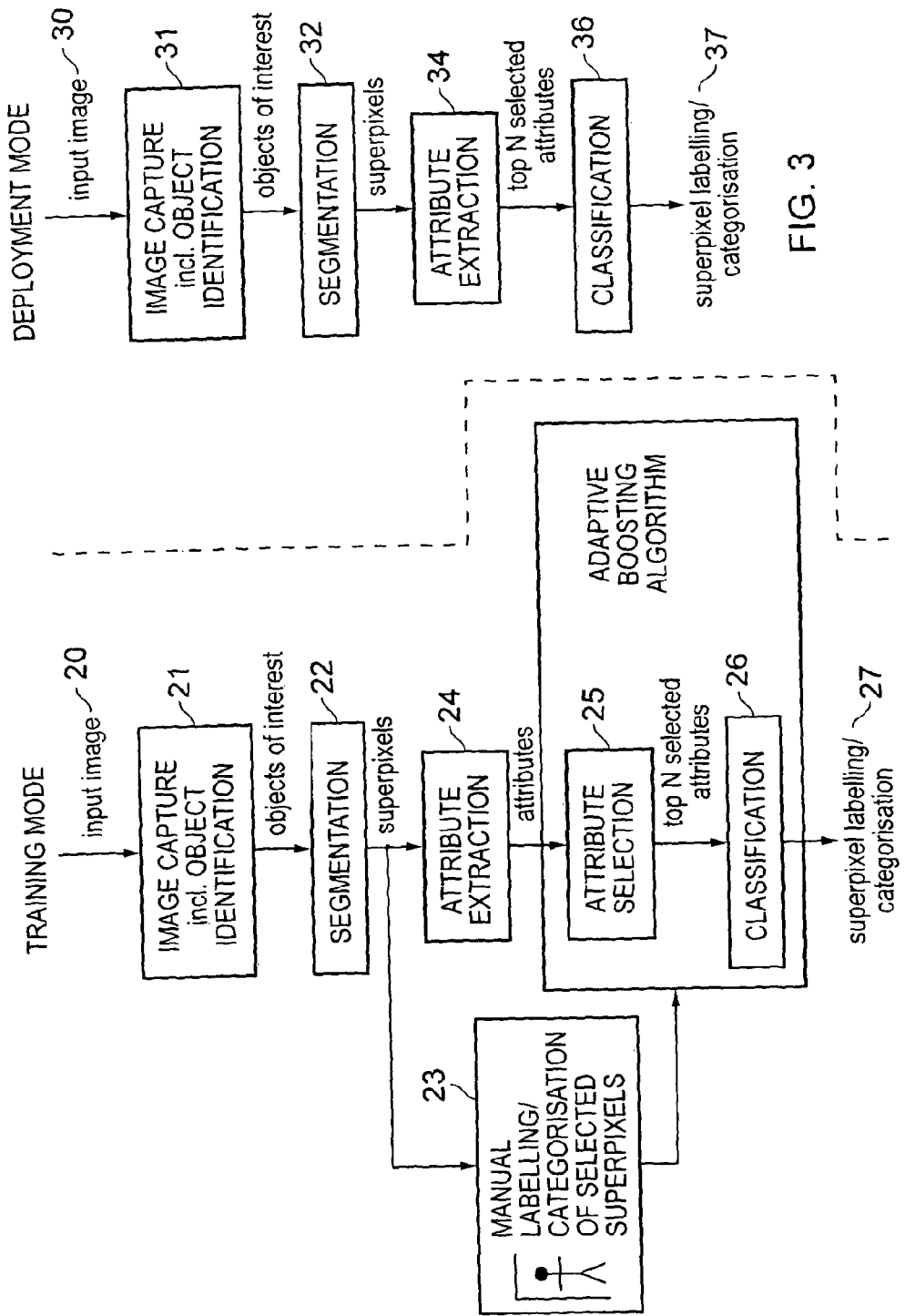

METHOD AND APPARATUS FOR AUTOMATIC DETECTION OF FEATURES IN AN IMAGE AND METHOD FOR TRAINING THE APPARATUS

CROSS-REFERENCE TO RELATED APPLICATIONS

This application is a national stage filing under 35 U.S.C. 371 of International Application No. PCT/GB2012/053019 filed Dec. 5, 2012, and claims foreign priority benefit of United Kingdom Application No. 1120865.9 filed Dec. 5, 2011, which are incorporated herein by reference in their entireties.

The present invention relates to methods for training image analysis apparatus and apparatus configured for such image analysis.

Automated inspection systems and apparatus that analyse images of objects are in widespread use for diverse applications. These applications include sorting, grading or quality analysis of food products and identifying defects, anomalies, blemishes or other features of interest in objects under inspection.

A basic requirement of these automated inspection systems is that they can be programmed or taught to identify features of interest in an image or in a target object within an image. For example, machine vision systems used in inspecting vegetable produce can be taught to spot features of interest such as roots, rotting parts, dents, cuts, symptoms of a disease, or the like. Such features would be identified by a manual user as features of interest and an automated system can be trained to spot these features automatically without user supervision. Training an automated inspection system is a time-consuming and complex process.

Typical automated inspection systems use several major steps including: pre-processing the image, e.g. to segment an object of interest from the background in the image, extracting image data attributes that summarise important qualities of the object, using a pattern recognition system to categorise the input data, etc. For example, colour and texture histograms may be used to classify different types of fruit and vegetables. Other examples include using Fourier harmonics to describe the shapes of an object of interest e.g. potatoes, and forming a metric based on the first few Fourier harmonics of the potato's outline to develop a classification method.

A limitation of typical machine vision systems is that the set of image features for pattern recognition has to be designed by the system engineer to work with a specific configuration of produce, a specific imaging system (e.g. camera-based system) and specific operating conditions (e.g. lighting, background environment). Such systems typically do not generalise well to other configurations, where the required image features may well differ from those used to design the original system.

It is therefore desirable to use an adaptive algorithm to automatically select good image data attributes for a particular pattern recognition task. A minimal set of image data attributes may be selected from a very large set of image data attributes, which measure statistical properties of the colour and texture distribution and/or the shape of the image region surrounding a given pixel. Thus the selected image data attributes used to build the final pattern recognition system are optimised for a particular application by learning from examples, and the system can be retrained to select a different set of image data attributes in order to accommodate different varieties of produce, seasonal variations, etc.

It is an object of the present invention to provide a faster and more efficient way of adapting an automated inspection system to new image analysis tasks. This adaptation task may be referred to as training the automated inspection system According to a first aspect, there is provided a method of training an apparatus for automatically detecting features of interest in an image, the method comprising:
  receiving an image of at least one object for inspection, each image comprising a plurality of pixels;
  segmenting the image into a plurality of superpixels, each superpixel comprising a plurality of pixels which each have similar image data attributes to one another;
  classifying the superpixels into at least two classes in response to user input identifying at least one feature of interest in one or more of the superpixels;
  determining, from a library of image data attributes, a subset of image data attributes that provides preferential discrimination between the at least two classes; and
  training the apparatus using said determined subset of image data attributes to thereby enable the apparatus to automatically classify superpixels of an image into the at least two classes.

By segmenting the image into superpixels which each already have similar image data attributes, the image has thereby been grouped into meaningful collections of pixels having similar attributes. From this, when a user manually identifies that a some superpixels belongs in one class and the other superpixels belong in another class, a meaningful comparison of regions of an image for image analysis can be performed in a much quicker fashion than could be performed using currently known methods.

At least one of said at least two classes may correspond to superpixels having a particular feature of interest.

Classification of particular superpixels as a particular class may be performed in response to the user input identifying those particular superpixels as having no particular feature(s) of interest.

Classification may comprise:
  assigning superpixels that were actively selected by user input to one or more corresponding classes; and
  allocating all superpixels that were not actively selected by user input to a further class.

The subset of image data attributes may comprise the subset of image data attributes that provide maximum discrimination between superpixels of the at least two classes.

The subset of image data attributes may comprise image data attributes that provide the best signal-to-noise ratio for predicting the correct class for one or more of the superpixels.

The method may comprise determining, from a library of image data attributes, a plurality of subsets of image data attributes which each provide a particular type of preferential discrimination between the at least two classes.

The segmentation of the received image may comprise:
  seeding a plurality of pixels of a particular received image; and
  growing a corresponding superpixel from each seed pixel to include neighbouring pixels that have similar image data attributes and excluding neighbouring pixels that have dissimilar image data attributes.

The pixels of each superpixel may each be similar to one another with respect to a similarity measure.

The similarity measure may be based on one or image data attributes.

The user input may be provided by manual selection of superpixels. The manual selection may indicate labelling, categorisation and/or classification of superpixels.

In a second aspect described herein, there is provided a method of automatically detecting features of interest in an image by a trained apparatus, the method comprising:

receiving an image of at least one object for inspection, each image comprising a plurality of pixels;

segmenting the image into a plurality of superpixels, each superpixel comprising a plurality of pixels which each have similar image data attributes to one another;

classifying the superpixels of the image into at least two classes in accordance with a predetermined subset of image data attributes, determined from a library of image data attributes, that provides preferential discrimination between the at least two classes; and identifying any features of interest on the at least one object to be inspected based on the classified superpixels.

Classification may comprise:

determining image data attributes of the superpixels;

comparing corresponding image data attributes of the superpixels with the predetermined subset of image data attributes;

ascertaining, based on said comparison, to which class each superpixel corresponds; and placing each superpixel in a corresponding class.

The method may comprise classifying said superpixels in accordance with a plurality of subsets of image data attributes which each provide a particular type of preferential discrimination between the at least two classes.

The segmentation of superpixels may comprise:

seeding a plurality of pixels of a particular received image; and growing a corresponding superpixel from each seed pixel to include neighbouring pixels that have similar image data attributes and excluding neighbouring pixels that have dissimilar image data attributes.

In a third aspect described herein, there is provided an apparatus, the apparatus having been trained by the method of the first aspect to perform the method of the second aspect.

In a fourth aspect described herein there is provided a computer readable medium comprising computer program code stored thereon, the computer program code being configured to, when executed on a processor, perform the method of the first aspect and/or the method of the second aspect.

In another aspect shown herein, there is also provided a method as depicted in any one of FIGS. 2 and 3.

Embodiments of the present disclosure will now be described by way of example and with reference to the accompanying drawings in which:

FIG. 2 shows a flowchart according to a first method of the present disclosure, and FIG. 3 shows a flowchart according to a second method of the present disclosure.

Figure 1:
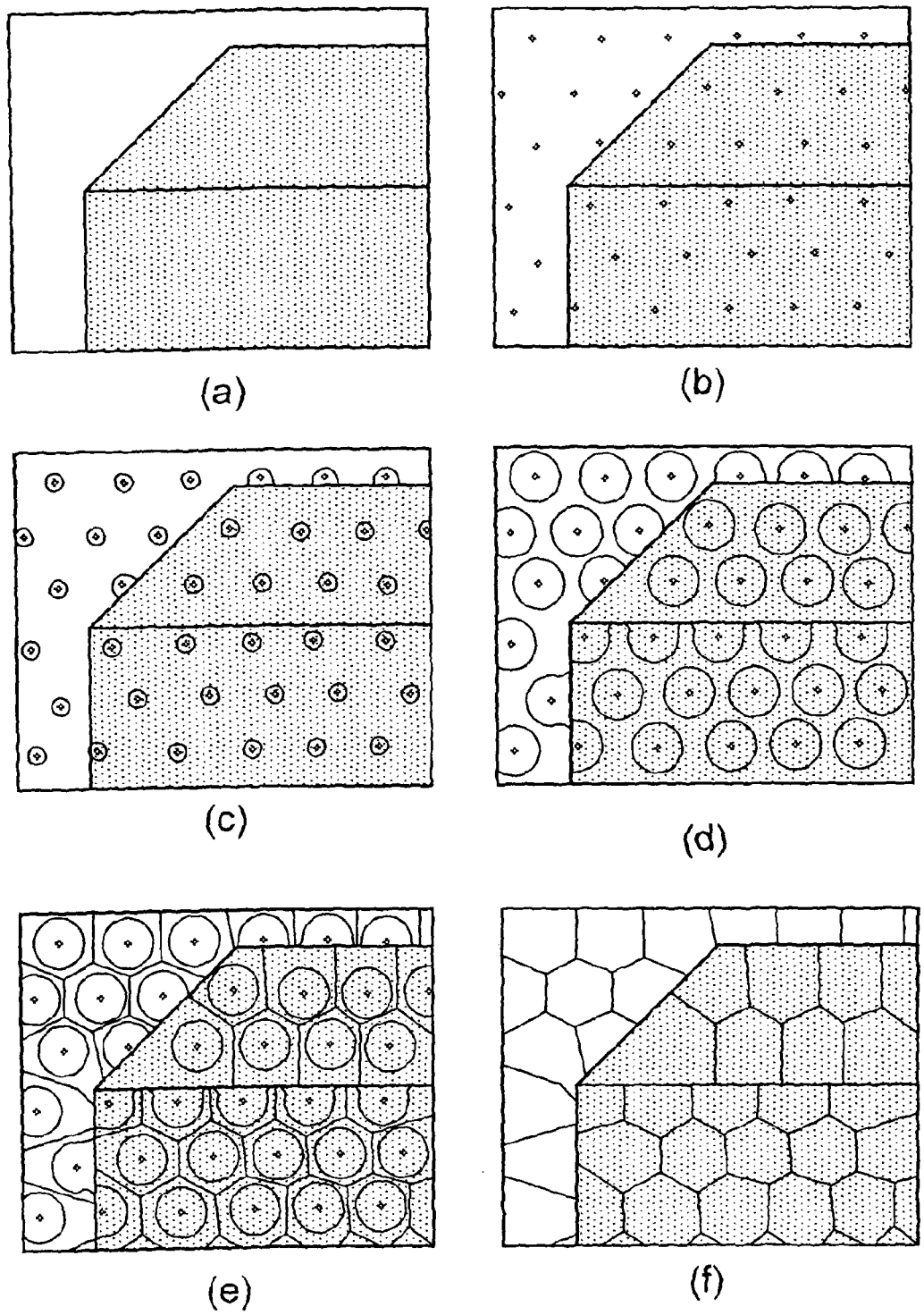
FIG. 1 shows a method of superpixelation known to those skilled in the art.

FIG. 1 shows the process of 'superpixelation' of an image, which is a process known to those skilled in the art. Superpixelation involves segmenting an image (image (a)) into a number of groups of pixels (see image (f)), where each pixel in each group has similar image data attributes to one another. A superpixel can be understood to comprise a homogeneous image region which is comprised of multiple contiguous pixels.

While there are a number of different algorithms for performing such superpixelation, generally the process involves a number of seed pixels being selected from the image (for example, seed pixels evenly distributed across the image—see (b) of FIG. 1) and then a superpixel is 'grown' from each seed pixel (see (c) of FIG. 1). Each superpixel grows to include neighbouring pixels that have similar image data attributes, and to exclude neighbouring pixels that have dissimilar image data attributes (see (d) and (e) of FIG. 1). This will mean that the growth of the superpixel may be impeded in the direction of neighbouring pixels whose image data attributes diverge from the image data attributes of a given superpixel, and the growth will continue in the direction of neighbouring pixels whose image attributes remain similar to those of that given superpixel.

Each seeded pixel will grow to form a superpixel that abuts a number of other superpixels (see (e) and (f) of FIG. 1) where the pixels within each respective superpixel are similar to one another with respect to a similarity measure, such as colour, brightness, grey levels, etc.

This principle of superpixelation can be utilised as part of an improved method of training an apparatus for automatically detecting features of interest in an image.

In one or more embodiments described herein, there is provided a method of training an apparatus. The method trains the apparatus to automatically detect features of interest in an image. An image is received, the image being of at least one object for inspection, each image comprising a plurality of pixels. The image is segmented into a plurality of superpixels, each superpixel comprising a plurality of pixels which each have similar image data attributes to one another. The superpixelated image is then presented to a user on a display. The user selects superpixels that correspond to features of interest, e.g. blemishes in a vegetable, or defective seals in a package. These selected superpixels are used to define at least one class of superpixels. The user also selects superpixels as belonging to a class of superpixels with no features of interest, e.g. blemish-free areas of a vegetable, or correctly sealed regions of a package, etc. These at least two classes of 'features of interest' vs. 'no features of interest' provide the minimum comparison needed to help establish discrimination of features of interest from an image.

In another embodiment, all superpixels that were not actively selected by a user/user input may automatically define another class. For example, a user actively selects some superpixels as belonging to one or more classes indicating various blemish types in a vegetable, and does not actively select any as belonging to a further class indicating healthy portions of the vegetable. The method then allocates all remaining unselected pixels to that further class indicating healthy regions of the vegetable.

Alternatively, the method could allocate all remaining unselected pixels to a further class indicating that such superpixels are unclassified and not to be used in the remainder of the method.

From a library of image data attributes, a subset of image data attributes is determined that provides preferential discrimination between superpixels of the at least two classes. The apparatus is then trained using said determined subset of image data attributes to thereby enable the apparatus to classify superpixels of an image into the at least two classes. The trained apparatus can operate on another new image, or it could operate on another part of the original image that was not used as part of the training method to further classify any unclassified superpixels.

A method of the present disclosure is described below with reference to FIG. 2.

Step 1: Image Capture and Object Identification

An image depicting at least one object for inspection is received (step 20). The image comprises a plurality of pixels so as to allow for superpixelation and later analysis. In this example the input image is a digital image that was obtained via a CCD or CMOS-based image capture device. In other examples the image could be received from laser scatter imaging or a polarised light stress analysis test for example. It will be appreciated by the skilled person that the image can be any graphical representation of an object that has been obtained via recordal of electromagnetic radiation.

This step can also optionally include identification of one or more objects for inspection from the image (step 21), which can involve discerning an individual object from other objects or separating a particular object from the background of the image. Methods for performing such separation are known in the art, for example, using standard image processing techniques (which can be selected or vary according to the chosen application, or according to a particular imaging system).

Step 2: Superpixel Segmentation/Oversegmentation

This step involves grouping of image pixels in the objects of interest into particular regions in such a way that all pixels in a region are similar with respect to some kind of similarity measure (step 22). As is known to those skilled in the art, a number of seed pixels are 'planted' and the resulting superpixel groups are grown from those pixels, where the growth is restricted or even prevented in directions where pixels are not similar enough to the seed pixel or group as a whole. It is also known in the art that over-segmentation refers to where an image with objects of interest is superpixelated not just into individual objects of interest, but further into sub-components. The discussion below will refer to segmentation to encompass both segmentation and over-segmentation processes.

Superpixelation will generally (though not necessarily) result in the superpixels being irregularly shaped. This step therefore obtains a representation of the objects which can allow for more compact analysis than that of a non-segmented image, and can also be seen as independent of the pixel resolution of the image. This eliminates the need to analyse or consider the image data attributes of every single pixel in an image or selected region, as each superpixel represents pixels having common image data attributes. There are many different algorithms known to those skilled in the art that can be used to perform this superpixelation step. As this step is to achieve logical groupings of pixels where the pixels of each group are similar to one another, any such process can be used. As such, the superpixelation process can be understood to be independent of any particular algorithm for superpixel segmentation.

Step 3: Manual Categorisation of Selected Superpixels

The user is presented with a superpixelated rendering of the image on a display. The user then manually selects one or more of the superpixels to provide user input identifying which superpixels contain a feature of interest (step 23).

The image analysis apparatus then automatically classifies (e.g. by labelling or categorisation) the superpixels into two or more classes, K, according to the user selection. In any application, the minimum number of classes, K (or categories) will always be two. A first class corresponds with regions containing some feature of interest, and there must also be a second class that corresponds with regions that do not contain features of interest.

For example, in the case of vegetable produce it is desirable that each vegetable item to be sold is free of defects or anomalies. This can therefore correspond to at least two classes of "anomalous" and "non-anomalous" vegetable items. Similarly, more than two categories could be provided to designate particular types of anomalies (e.g. corresponding to "non-anomalous", "anomaly type 1", "anomaly type 2", etc) or even further classes could be provided for more precise classification. It will be appreciated that different classes will be correspondingly associated with particular features of interest.

Such classes, K, can be created, modified and/or designated by a user and/or by an apparatus that implements this method in order to better distinguish between possible classes of features of interest.

The user might actively select some superpixels as having features of interest, but could also positively indicate that a superpixel does not have a feature of interest. It will also be appreciated that the absence of an indication (e.g. negative selection) could also be understood to negatively indicate that a given superpixel does not contain a feature of interest.

In any case, in response to the user input identifying at least one feature of interest in one or more of the superpixels, the method automatically classifies the respective superpixels into the at least two (or more) corresponding classes, K. It is possible for the method to automatically allocate any superpixels that were not actively selected by the user as belonging to a further class. That further class might be a class understood to contain superpixels with no features of interest, and those superpixels would then be used in the rest of the method for comparison with other classes. That further class might instead be a class representing unassigned superpixels, and those superpixels would then not be used in the rest of the method, i.e. ignored.

Step 4: Attribute Extraction

Each pixel in a superpixel is similar to every other pixel with respect to some similarity measure. Each superpixel therefore provides a meaningful representation of the respective attributes of the pixels contained therein. A limited range of values of a particular attribute such as colour, brightness, etc can be calculated easily for pixels within a given superpixel (step 24).

Image data attributes can include one or more of: red channel, green channel, blue channel, mean pixel value, median pixel value, minimum pixel value, maximum pixel value, skewness, standard deviation of pixel values, edges, range and/or edge normalised values of any of these listed attributes, laser scatter image values, polarised light stress values, or the like. A list of attributes in one implementation comprises the attributes of: mean red, standard deviation red, skewness red, mean blue, standard deviation blue, skewness blue, mean green, standard deviation green, skewness green, mean normalised red, standard deviation normalised red, skewness normalised red, mean normalised blue, standard deviation normalised blue, skewness normalised blue, mean normalised green, standard deviation normalised green, skewness normalised green, mean intensity, standard deviation intensity, skewness intensity, mean edge intensity, standard deviation edge intensity, skewness edge intensity, mean range, standard deviation range, skewness range, sobel edge length, sobel edge count, range edge length, and range edge count. It will be appreciated that this list is not exhaustive, but merely giving examples. Other attributes that can be used as a means to describe aspects of the image data can be understood to be encompassed by the term 'image data attributes'.

A number of different image data attributes can therefore be calculated for each superpixel using less processing power than would be required if the same process was to be repeated for every pixel across the image. The image data attributes can also be referred to as candidate features. One method of obtaining these image data attributes/candidate features is to calculate statistical summaries of attributes of individual pixels contained within a superpixel, for example, the first n moments of a distribution (e.g. based on mean pixel value, standard deviation of pixel values, skewness of pixel values, etc).

Also, a bank of image filters can be applied to the original image to generate a variety of pixel attributes, which can then be summarised by superpixel group as described above. Example image filters include conversion between different colour spaces, image sharpening operations, image blurring operations, etc. Other candidate features may include global properties of the superpixels, such as attributes describing the shape, size or boundary of a superpixel.

Each superpixel can be used in such a way to summarise image data attributes for a group of pixels. Segmentation of the image helps to reduce the overall computational complexity that would otherwise be necessary with current methods. This means that, for a given system, it is possible to increase computing speeds and can even allow for larger numbers of attributes to be determined for a given superpixel than would otherwise be practical to perform for each and every pixel in an image (under existing methods).

Step 5: Attribute Selection

Once image data attributes have been calculated for each superpixel, the image data attributes for each superpixel can be reviewed by a machine learning algorithm to establish which attributes are most useful in discriminating between superpixels of one class and superpixels of another (step 25). The user input from step 23 is used as an input for this portion of the method.

The machine learning algorithm is employed to select a subset of image data attributes, N, out of a library, M, of image data attributes that is available for superpixels over an image, with N<<M. This subset, N, of image data attributes should, ideally, reflect some kind of metric which provide a useful way to discriminate between the different classes. For example, between superpixels of a first class and superpixels of a second class, there might be a pronounced difference between the red channel superpixel image data attribute values of each class. This can be used as at least one image data attribute in a subset to help discriminate superpixels in future images as one class or another. The image data attributes showing the strongest discrimination between classes can be ranked according to the magnitude of the difference between the image data attributes.

This ranking may be according to the image data attributes have the highest signal-to-noise ratio in predicting the correct output category for a given superpixel. There will be a subset, N, which contain the top image data attributes useable for preferential discrimination between classes. From this subset, N, different selections of attributes can be made to provide for particular types of preferential discrimination between classes. For example, a particular selection of three image data attributes out of the subset, N, of top image data attributes (which may not necessarily be the top three attributes) could provide for better discrimination between a first class and second class, but may not be useful (or less useful) for discriminating between the second class and a third class. These three selected attributes would therefore provide a particular type of discrimination. Such types of preferential discrimination and the one or more attributes from the subset, N, that provide those different types of preferential discrimination would be evident from the various identified attributes of the subset, N.

The machine learning algorithm can further learn a pattern classification function which assigns an output category (one of the at least two previously defined categories) to a set of input features corresponding to a given superpixel to allow for classification of superpixels into classes, K (step 26).

One method to achieve this step is to employ a machine learning algorithm (such as an adaptive boosting algorithm like the AdaBoost algorithm) to both select preferential (or best) features and to train classifiers that use them. The AdaBoost algorithm works by adaptively assigning weights to the training examples and iteratively learning weak classifiers and their corresponding weights or importance in the classification function. A broadly used type of weak classifier involves using decision stumps (a one-level decision tree corresponding to a single candidate feature and a decision threshold).

Step 6: Interactive, Incremental Training with a Graphical User Interface

After observing the results in the GUI, the human operator is able to modify the selected superpixels for each of the K classes, if so desired, to modify the determined subset, N, of image data attributes. The user can do this as many times as they like in order to modify (e.g. improve or refine) the image data attribute subset, N, selection and pattern classification function. The trained system may also be tested on new images, captured with the same process as defined in step 1 above, and subjected to further refinement of the feature selection and pattern classification function by the human operator, as described above, to provide for final superpixel labelling/categorisation (step 27). This can be performed via online object analysis with a user supervising the iterations. This can involve a user selecting/deselecting superpixels to modify the results generated, but can also involve incremental training and storing of previous results to further train the apparatus.

This is a key innovation enabled by the computational speed-ups obtained through the above process is that the system can be incrementally trained in an interactive fashion by a human operator using a graphical user interface (GUI), until the desired level of classification performance is obtained.

Because the computational complexity is greatly reduced via at least the superpixelation pre-grouping step, it is possible to perform iterative learning and supervision in real-time rather than over a longer period of minutes/hours. The iterative review that can be performed can be seen in real-time due to the reduced computational load of this method. This also allows for a generalised approach to teaching/training apparatus as the above described method is not specific to any one field.

Step 7: Deployment of the Trained Classifier

FIG. 3 illustrates in more detail the deployment (or deployment mode) of the trained apparatus described in FIG. 2.

After the subset of image data attributes has been determined, the image analysis apparatus can be deployed to automatically recognise and classify (step 36) superpixels into the classes, K, using the determined subset, N, of image data attributes. The act of "training the apparatus" can be understood to encompass, in effect, "configuring the apparatus" or can even be understood to encompass a single apparatus "self-configuring" itself so as to allow itself to be trained for image analysis. The operation of such trained apparatus is explained below with reference to FIG. 3.

In essence, the method of FIG. 2 is repeated as part of the deployment mode, except that where a user would provide input indicating superpixels having a feature of interest the trained apparatus (automatically) instead classifies (step 36) the superpixels of the image into the at least two classes in accordance with the predetermined subset of image data attributes, determined from a library of image data attributes, to provide preferential discrimination between the at least two classes, K.

The method of FIG. 3 uses the predetermined subset of image data attributes to then calculate image data attributes of the superpixels of an image to be analysed (image data attribute calculation already described above), and then compares those calculated image data attributes of the superpixels with the predetermined subset of image data attributes. Because the more critical image data attributes needed for calculation are known from the predetermined subset of image data attributes, the method only needs to calculate those image data attributes of the superpixels for comparison against the predetermined subset.

After this point, it is necessary to ascertain, based on said comparison, to which class each superpixel corresponds so that the method can then place each superpixel in a corresponding class. This might involve ascertaining whether a given image data attribute matches or exceeds or does not exceed a particular threshold provided by the predetermined subset of image data attributes, or some other way of comparing values and reaching a conclusion. The method completes the classification of each superpixel by placing each superpixel in a particular class. The operation of the trained apparatus can also be used to classify superpixels of other parts of an image that was previously used as part of the training method.

From this, the method can then identify which superpixels are indicative of particular features of interest of an object being inspected based on the class to which they have been assigned. Particular regions of an object or even the objects themselves can therefore be identified as anomalous/non-anomalous, or whatever characteristic a particular application demands.

These methods can be implemented in the same or different apparatus. For example, one apparatus could be used to perform the determination of image data attributes to be used as a subset for preferential discrimination. This subset of image data attributes (with or without additional training data) would reflect the training that has been established through the training method. This information can then be ported to other apparatus that are to perform similar operations. As such it is not necessary to individually train apparatus to perform similar tasks, as the same data can be ported between apparatus.

Other embodiments are intentionally within the scope of the accompanying claims.

The invention claimed is:

1. A method of training an apparatus for automatically detecting features of interest in an image, the method comprising:
   receiving an image of at least one object for inspection, each image comprising a plurality of pixels;
   segmenting the image into a plurality of superpixels, each superpixel comprising a plurality of pixels which each have similar image data attributes to one another;
   classifying the superpixels into at least two classes in response to user input identifying at least one feature of interest in one or more of the superpixels;
   determining, from a library of image data attributes, a subset of image data attributes that provides preferential discrimination between the at least two classes;
   providing the determined subset of image data attributes to a user;
   modifying which of the at least two classes one or more of the superpixels are classified as in response to further user input;
   determining, from the library of image data attributes, a final subset of image data attributes that provides preferential discrimination between the modified at least two classes; and
   training the apparatus using said determined final subset of image data attributes to thereby enable the apparatus to automatically classify superpixels of an image into the at least two classes.

2. The method of claim 1, wherein at least one of said at least two classes corresponds to superpixels having a particular feature of interest.

3. The method of claim 1, comprising classifying particular superpixels into a particular class in response to the user input identifying those particular superpixels as having no particular feature(s) of interest.

4. The method of claim 3, wherein the step of classifying comprises:
   assigning superpixels that were actively selected by user input to one or more corresponding classes; and
   allocating all superpixels that were not actively selected by user input to a further class.

5. The method of claim 1, wherein the subset of image data attributes comprises the subset of image data attributes that provide maximum discrimination between superpixels of the at least two classes.

6. The method of claim 1, wherein the subset of image data attributes comprises image data attributes that provide the best signal-to-noise ratio for predicting the correct class for one or more of the superpixels.

7. The method of claim 1, wherein the method comprises determining, from a library of image data attributes, a plurality of subsets of image data attributes which each provide a particular type of preferential discrimination between the at least two classes.

8. The method of claim 1, wherein the segmentation of the received image comprises:
   seeding a plurality of pixels of a particular received image; and
   growing a corresponding superpixel from each seed pixel to include neighbouring pixels that have similar image data attributes and excluding neighbouring pixels that have dissimilar image data attributes.

9. The method of claim 1, wherein the user input is provided by manual selection of superpixels.

10. The method of claim 1 further comprising automatically detecting features of interest in an image by a trained apparatus, by:
    receiving (31) a second image (30) of at least one object for inspection, each image comprising a plurality of pixels;
    segmenting (32) the second image (30) into a plurality of superpixels, each superpixel comprising a plurality of pixels which each have similar data attributes to one another;
    classifying (36) the superpixels of the second image (30) into at least two classes in accordance with the final subset of image data attributes; and
    identifying (37) any features of interest on the at least one object to be inspected based on the classified superpixels.

11. The method of claim 10, wherein classifying comprises:
    determining (34) image data attributes of the superpixels;
    comparing corresponding image data attributes of the superpixels with the final subset of image data attributes;
    ascertaining, based on said comparison, to which class each superpixel corresponds; and
    placing each superpixel in a corresponding class.

12. The method of claim 11, wherein the method comprises classifying said superpixels in accordance with a plurality of subsets of image data attributes which each provide a particular type of preferential discrimination between the at least two classes.

13. The method of claim 12, wherein the segmentation of superpixels comprises:
- seeding a plurality of pixels of a particular received image; and
- growing a corresponding superpixel from each seed pixel to include neighbouring pixels that have similar image data attributes and excluding neighbouring pixels that have dissimilar image data attributes.

14. An apparatus, the apparatus having been trained by the method of claim 1.

15. A non-transitory computer readable medium comprising computer program code stored thereon, the computer program code being configured to, when executed on a processor, perform the method of claim 1.

16. A method as depicted in any one of FIGS. 2 and 3.

17. An apparatus configured to perform the steps of claim 1.

18. The apparatus of claim 14 to perform the method of
- receiving an image of at least one object for inspection, each image comprising a plurality of pixels;
- segmenting the image into a plurality of superpixels, each superpixel comprising a plurality of pixels which each have similar data attributes to one another;
- classifying the superpixels of the image into at least two classes in accordance with a predetermined subset of image data attributes, determined from a library of image data attributes, that provides preferential discrimination between the at least two classes; and
- identifying any features of interest on the at least one object to be inspected based on the classified superpixels.

19. A non-transitory computer readable medium comprising computer program code stored thereon, the computer program code being configured to, when executed on a processor, perform the method of claim 10.

* * * * *